Dec. 3, 1963   F. W. KATELEY   3,112,959
SERVICE AND EMERGENCY BRAKE
Filed May 25, 1956   3 Sheets-Sheet 1

INVENTOR
FRANCIS W. KATELY

BY Strauch, Nolan & Neale
ATTORNEYS

Dec. 3, 1963   F. W. KATELEY   3,112,959
SERVICE AND EMERGENCY BRAKE
Filed May 25, 1956   3 Sheets-Sheet 2

INVENTOR
FRANCIS W. KATELY

BY Strauch, Nolan & Neale
ATTORNEYS

Dec. 3, 1963  F. W. KATELEY  3,112,959
SERVICE AND EMERGENCY BRAKE
Filed May 25, 1956  3 Sheets-Sheet 3

INVENTOR
FRANCIS W. KATELY

BY Strauch, Nolan & Neale
ATTORNEYS

United States Patent Office 3,112,959
Patented Dec. 3, 1963

3,112,959
SERVICE AND EMERGENCY BRAKE
Francis W. Kateley, Detroit, Mich., assignor to Rockwell-Standard Corporation, a corporation of Pennsylvania
Filed May 25, 1956, Ser. No. 587,247
1 Claim. (Cl. 303—6)

This invention relates to improvements in vehicle brake systems and has particular reference to a combination service and emergency air brake actuator which is effective to arrest vehicle movement in the event of loss of brake operating air pressure.

It is becoming more and more important that heavy commercial vehicles with air brake systems be provided with auxiliary brake means or brake actuating means that automatically become effective as air pressure falls below safe limits or fails completely in the air brake air supply system.

The primary object of this invention is, therefore, to provide auxiliary brake means for a vehicle with air brakes which becomes effective as the vehicle air supply pressure falls below safe limits or fails completely.

Another object is to provide means for actuating brakes which nullifies service brake failure by loss of air.

A further object is an actuator assembly which operates a brake in the normal manner as a service brake with air pressure and which operates the same brake automatically in the event of air pressure loss.

Another object is brake actuating spring means which is held in an inactive state by air pressure as long as service air brake air supply pressure is above a minimum pressure level.

A further object is to provide a vehicle brake system embodying manually operable means for releasing emergency spring actuated air brakes from their spring actuated state when vehicle air system pressure is below a minimum pressure level.

Further objects of the present invention will become apparent from the appended claim and the following description, when considered in connection with the accompanying drawings wherein:

Figure 1:
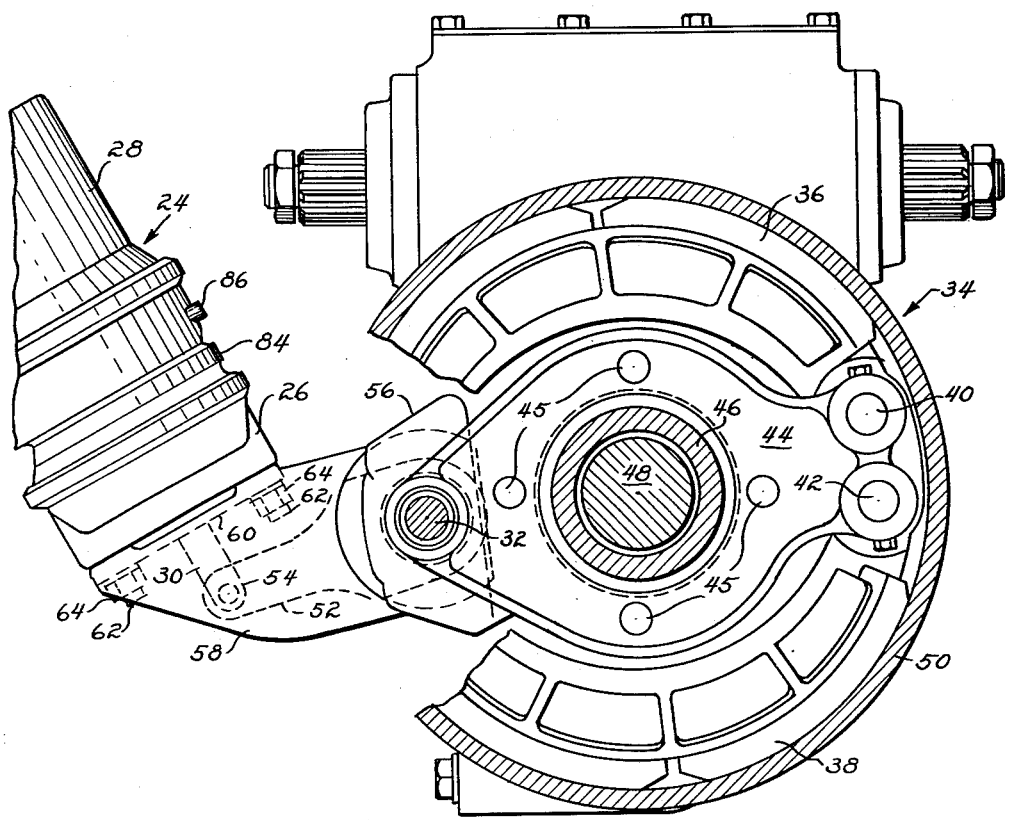
FIGURE 1 is a fragmentary partially sectioned, partially broken away, end view of brake equipped drive axle.
Figure 2:
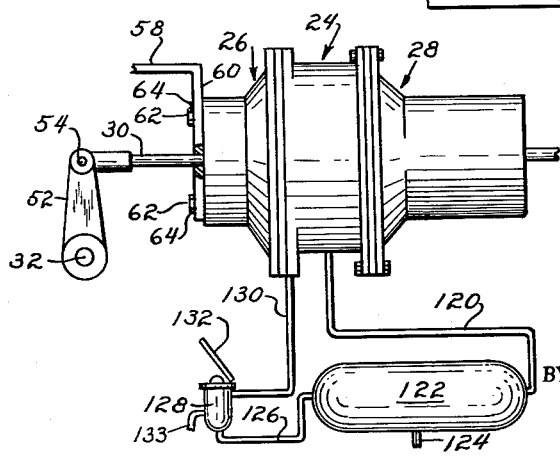
FIGURE 2 is a partial schematic view of a vehicle air brake system.
Figure 3:
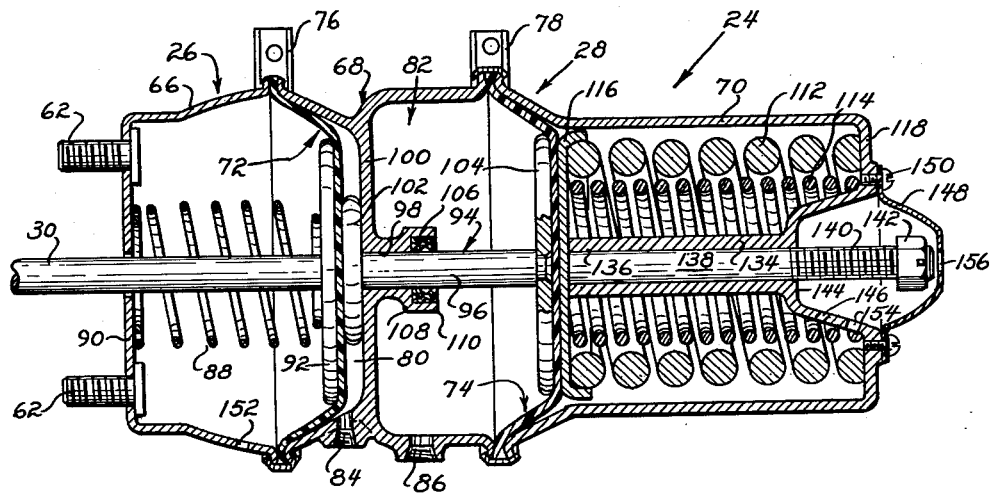
FIGURE 3 is a cutaway and sectioned view of a diaphragm air brake type service and emergency spring brake actuator assembly, being illustrated in its condition in the system of FIGURE 2 with air pressure available but with the brakes deenergized.

Referring now to FIGURES 1, 2 and 3 of the drawings, the present invention provides a new and improved brakes actuator assembly 24 embodying a normally employed compressed air powered service brake actuator 26 and a spring powered emergency actuator 28 which is normally maintained inoperative by the same air pressure which is utilized to power actuator 26 so that, in the event of loss of power to actuator 26, actuator 28 is immediately and automatically operative to actuate the brake. The actuators 26 and 28 act through a common push-rod 30 to pivot the cam shaft 32 of an internally expansible brake mechanism 34 (FIGURE 1). The brake mechanism 34 comprises basically a pair of brake shoes 36 and 38 pivotally mounted at 40 and 42 upon a mounting spider 44 fixed as by rivets 45 at the outer end of the axle housing 46 in surrounding relationship to the axle shaft 48 and is disposed internally of a brake drum 50 which is coaxially fixed to the wheel assembly (not shown) fixed for rotation with the outer end of the axle shaft 48. The brake shoes 36 and 38 are expanded into engagement with the brake drum 50 by partial rotation of the cam shaft 32 which has a cam (not shown) interposed between the ends of the arcuate brake shoes 36 and 38 opposite their pivots 40 and 42. Cam shaft 32 is coupled to the push rod 30 of the brake actuator 24 by an adjuster lever 52 which is fixed to the cam shaft 32 and pivotally connected at 54 to the push rod 30.

The actuator assembly 24 is mounted on the spider 44 by a tubular support 56 fixed to the spider 44 and a bracket 58 fixed to the end of tubular support 56 opposite the spider 44 and provided with a flange portion 60 to which the actuator 24 is fixed by bolts 62 and nuts 64. If further details of the brake mechanism structure illustrated in FIGURE 1 are found to be necessary to a complete understanding of the present invention, reference is made to United States Letters Patent No. 2,755,890 issued July 24, 1956, to Walther F. Scheel.

While for illustrative purposes only, a single brake mechanism 34 and actuator 24 have been shown, it is to be understood that in a vehicle such mechanisms and actuators are provided in the conventional manner at the outer ends of all brake equipped axles.

Referring now to FIGURE 3, the brake actuator 24 consists basically of three hollow housing members 66, 68 and 70 and a pair of diaphragms 72 and 74 which respectively are clamped by annular clamp 76 between the adjacent opposed peripheral edges of members 66 and 68 and by clamp 78 between the adjacent peripheral edges of members 68 and 70 to define expansible diaphragm chambers 80 and 82 into which air is introduced and exhausted through openings 84 and 86 respectively in the member 68.

The chamber 80 is the expansible chamber of the actuator 26 which is used for normal brake actuation and the chamber 82 is associated with the brake emergency actuator 28. As will be explained in greater detail presently, air pressure is maintained constantly in chamber 82 under normal operating conditions and is selectively applied to chamber 80 by the operator to effect brake actuation.

In the absence of fluid pressure within chamber 80 of service actuator 26, the brake actuating push rod 30 is normally resiliently biased toward its inoperative position as shown in FIGURE 3 by the return spring 88 which is compressed between the end wall 90 of member 66 and a thrust pad 92 fixed to the end of push rod 30 and in abutment with the diaphragm 72. Upon normal actuation of the brake, air will be introduced into chamber 80 to shift the diaphragm 72, thrust pad 92 and push rod 30 to the left as viewed in FIGURE 3 in opposition to the return spring 88 to actuate the brake mechanism 34 (FIGURE 1).

The brake emergency diaphragm 74 is coupled to the service actuator diaphragm 72 by a push rod assembly 94 which consists of a push rod 96 mounted for axial sliding movement through the bore 98 of an integral transverse partition 100 of the member 68, a thrust pad 102 fixed to the rod 96 within the chamber 80, and a thrust pad 104 fixed to the opposite end of the rod 96 in abutment with the diaphragm 74 within the diaphragm chamber 82. An annular sealing element 106 mounted in a boss 108 formed integrally with the partition 100 prevents fluid communication between the chambers 80 and 82 along rod 96 through the bore 98. The end face 110 of the boss 108 forms a limit stop which determines the limit of leftward axial movement of the push rod assembly 94 by abutment with the adjacent face of the thrust pad 104.

In the absence of fluid pressure within the chamber 82, diaphragm 74 is resiliently biased to the left as viewed in FIGURE 3 by a pair of coil springs 112 and 114 which are compressed between a spring retainer plate 116, which abuts the face of the diaphragm 74 opposite thrust pad 104, and the end wall 118 of the member 70.

Referring now to FIGURES 2 and 3, the emergency actuator diaphragm chamber 82 is connected through opening 86 and a conduit 120 to the compressed air tank 122 of the conventional air brake system in which operating air pressure is continuously maintained through a conduit 124 by an engine driven air compressor (not shown). Air is selectively introduced into diaphragm chamber 80 for normal actuation of the brakes through port 84 from the air tank 122 via conduit 126, control valve 128 and conduit 130, control valve 128 being selectively actuated in the conventional manner by the operator through lever 132 and conventionally equipped with an exhaust duct 133.

The normal driving condition of the actuator 24 is that illustrated in FIGURE 3. So long as normal operating air pressure is maintained within the tank 122 and chamber 82, the diaphragm 74 and the push rod assembly 94 remain in their rightward position as illustrated in FIGURE 3 in opposition to the force of the compression springs 112 and 114. Actuation of the brakes in the normal manner is effected by actuating valve 128 to introduce air under pressure into the chamber 80 and shift diaphragm 72, push rod 30 and thrust pad 92 to the left as viewed in FIGURE 3 to effect normal actuation of the brake mechanism 34. During such operation, the diaphragm 74 and push rod assembly 94 remain in the position shown in FIGURE 3.

In the event of loss of operating air pressure in the tank 122, so that the pressure within the diaphragm chamber 82 is insufficient to maintain the diaphragm 74 in the position illustrated in FIGURE 3, the compression springs 112 and 114 will expand to shift the diaphragm 74 and push rod assembly 94 to the left as viewed in FIGURE 3. Since the push rod assembly 94 is in abutment through thrust pad 102 with the diaphragm 72 and the thrust pad 92 with the push rod 30, direct thrust force will be applied from the springs 112 and 114 to the push rod 30 to effect actuation of brake mechanism 34.

During installation of the actuator 24 or after emergency actuation of the brakes in the manner just described, it may become necessary to manually effect de-energization of the brake 34. For this purpose, the present invention provides a means whereby the resilient biasing force of the springs 112 and 114 may be relieved from the diaphragm 74. For this purpose, the member 70 is formed with an axially extending boss 134 in the bore 136 of which is axially slidably received a shaft 138 one end of which is fixed to the spring retainer plate 116 and the other end of which is threaded at 140 to receive a nut 142. The boss 134 on member 70 terminates in an end wall 144 which is the bottom wall of a cup-shaped portion 146 of member 70 interconnecting the end wall 118 thereof with the boss 134. By rotation of nut 142 along the threaded portion 140 of the shaft 138 while the nut 142 is in abutment with the face 144, the shaft 138 will be pulled to the right as viewed in FIGURE 3 in opposition to the resilient biasing spring pressure applied through the diaphragm 74, the push rod assembly 94, and the diaphragm 72 to the push rod 30.

The cup-shaped portion 146 of the member 70 is enclosed by a cap 148 fixed to the end wall 118 of member 70 by screws 150 to shield the threaded end 140 of the push rod 138 and the nut 142 from dirt, dust and moisture.

Bleed aperture 152 is provided through the member 66 to permit ingress and egress of air from the interior of member 66 with the movement of the diaphragm 72 and bleed apertures 154 and 156 are formed respectively through the depression 146 and the cap 148 to permit free ingress and egress of air to and from the interior of the member 70 to permit unrestrained movement of the diaphragm 74 in response to the fluid pressure introduced into chamber 82 through the inlet 86.

Figure 4:
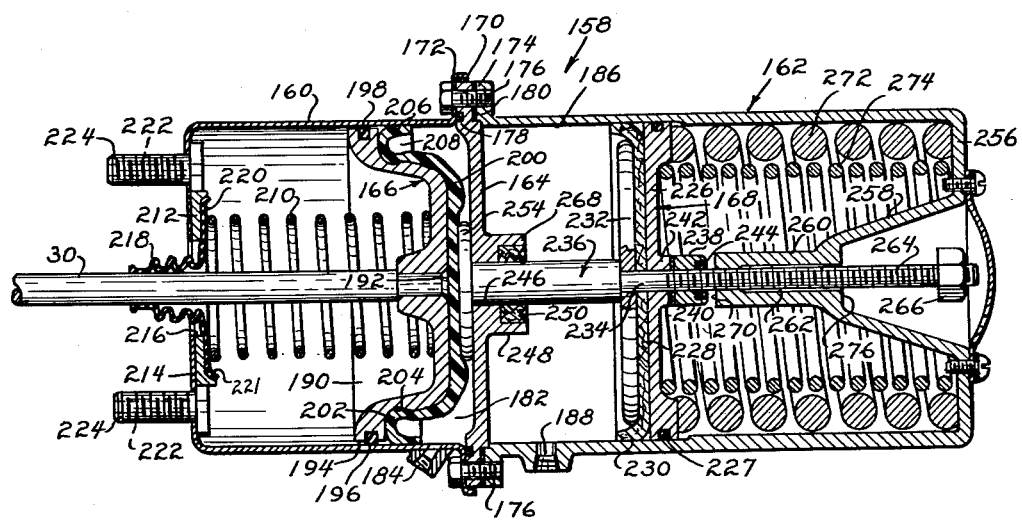
FIGURE 4 is a cutaway and sectioned view of an air brake cylinder type service and emergency spring brake actuator assembly, being illustrated under the same conditions as the assembly of FIGURE 3.

A modified form of the actuator 24 is illustrated in FIGURE 4. As is apparent, the actuator 158 of FIGURE 4 utilizes piston type expansible fluid chambers in lieu of the diaphragm type expansible fluid chambers of the actuator 24 of FIGURE 3.

The actuator 158 consists basically of a pair of hollow cylinder members 160 and 162 separated by a partition member 164, a piston assembly 166 mounted for axial sliding movement within the cylinder member 160 at one side of the partition member 164 and a piston assembly 168 mounted for axial sliding movement within the cylinder member 162 at the opposite side of partition member 164.

The partition member 164 terminates in a peripheral flange 170 which is interposed between the flange 172 on member 160 and a flange 174 on member 162. Flanges 170, 172 and 174 are assembled together in fixed relation by bolts 176 extending through aligned apertures in the flanges 170 and 172 and threaded into aligned apertures in the flange 174. Fluid tight relation between the flanges 170 and 172 is maintained by a sealing element 178 received within an annular recess in flange 170 and in abutment with the adjacent face of the flange 172 and between flanges 170 and 174 by a gasket 180 interposed therebetween.

The piston assembly 166 coacts with the cylinder member 160 and the adjacent face of partition member 164 to define an expansible fluid chamber 182 corresponding to chamber 80 of FIGURE 3 into which air is introduced and exhausted through the port 184 which is connected via conduit 130, control valve 128 and conduit 126 to the air tank 122 of FIGURE 2.

Piston assembly 168 cooperates with cylinder member 162 and the adjacent face of partition member 164 to define expansible chamber 186 corresponding to chamber 82 of FIGURE 3 which is in constant fluid communication with the air tank 122 via port 188 and conduit 120.

The piston assembly 166 is formed by a cup-shaped piston 190, which is riveted at 192 to the end of the push rod 30 and which terminates in an annular peripheral face 194 having an annular groove 196 formed therein to receive an annular felt wiper 198, and a flexible cap member 200 formed of a suitable elastomeric material which covers the face of piston 190 adjacent the chamber 182 and is retained thereon by the engagement of an inwardly facing annular bead 202 formed thereon and which engages an annular recess 204 formed on that face of the piston 190. Cap member 200 terminates in a flexible annular sealing lip 206 which is in sliding contact with the internal cylindrical surface of the member 160 and forms a fluid tight seal therewith, being firmly pressed into sealing relation with that surface by air pressure acting on the face 208 thereof. The annular peripheral wall 194 of the piston 190 is of slightly smaller diameter than the internal diameter of the cylinder member 160 to permit limited canting of the piston 190 within the cylinder member 160 as required by the slight angular movement of the push rod 30.

Piston assembly 166 is resiliently biased to the right as viewed in FIGURE 4 by a compression spring 210 compressed between the face of the piston 190 and a retainer 212 mounted coaxially on the end face 214 of the cylinder member 160. Entrance of dirt, dust and moisture into the interior of the cylinder member 160 through the opening 216 in the end wall 214 of the member 160 through which push rod 30 extends is prevented by a conventional flexible boot 218 surrounding the push rod 30 in fluid tight relation and having a flange 220 which extends between a metal sealing seat 221 and the retainer 212 and is retained in position therebetween by coil spring 210. Bleed ports 222 are formed coaxially through the mounting studs 224 (corresponding to studs 62 of FIGURE 3), which are fixed to the end wall 214 of the member 130, to permit ingress and egress of air into the cylinder member 160 on the side of the piston assembly 166 opposite the chamber 182 so that the piston assembly 166 is free to move in response to fluid pressure within the chamber 182 uninhibited by the air pressure on the opposite face thereof.

Piston assembly 168 comprises a piston 226 having an annular felt wiper 227 in a peripheral groove thereof, a flexible annular disc 228 having a peripheral axially extending lip 230 in surface contact with the interior wall of the cylinder member 162, and a thrust plate 232 clamped in rigid assembly upon the reduced diameter portion 234 of a push rod assembly 236 by a nut 238 threadedly received on the end of reduced diameter portion 234. In order to prevent fluid leakage along the portion 234 of push rod 236, a gasket 240 is interposed between the nut 238 and the adjacent face of the coaxially apertured hub 242 on piston 226 and an annular sealing element 244 is received in an end counterbore in nut 238.

The push rod 236 extends through the bore 246 of a boss 248 formed integrally with the partition 164. An annular sealing element 250 is mounted within a counterbore 252 in boss 248 to prevent fluid leakage between the chamber 182 and the chamber 186 along rod 236. Push rod 236 is provided with an integral thrust pad 254 disposed within the chamber 182 in abutment with the cap member 200 when the piston assembly 166 is in its returned position illustrated in FIGURE 4.

The cylinder member 162 is provided with an end wall 256 in which is formed a depressed cup-shaped portion 258 terminating in an axially extending boss 260 having a through bore 262. Push rod 236 is formed with a further portion 264 of further reduced diameter which extends coaxially through the bore 262 of boss 260 and which is threaded to receive a nut 266 on the end thereof within the depressed portion 258. The limit positions of movement of the piston assembly 168 are defined by abutment of the thrust pad 232 with the end face 268 of the boss 248 and of the thrust pad 254 with the adjacent face of the partition 164. Piston assembly 168 is resiliently biased to the left as viewed in FIGURE 4 by coil compression springs 272 and 274 which are compressed between the end wall 256 and the opposed face of the piston 226.

In normal operation with the engine running, fluid pressure is constantly applied through the conduit 120 (FIGURE 2) and the opening 188 to the chamber 186 to maintain piston assembly 168 in its rightward position against the resilient force of the springs 272 and 274 as illustrated in FIGURE 4. The nut 266 may be threaded along the portion 264 of the push rod 236 while in abutment with the end face 276 of the depressed portion 258 to retract the piston assembly 168 in opposition to the force of the springs 272 and 274 in the same manner that diaphragm 74 of the embodiment of FIGURE 3 may be retracted by nut 142 as described above. The operation of the second embodiment of this invention in the system of FIGURE 2 is the same as has been described for the embodiment of FIGURE 3 above.

Figure 6:
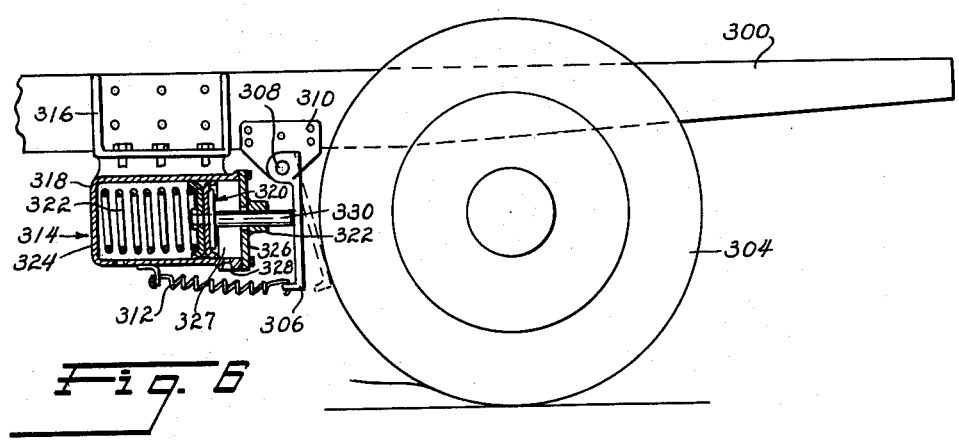
FIGURE 6 is a partial side view of the vehicle showing the emergency air failure spring actuated wheel tire engaging brake of FIGURE 5.
Figure 5:
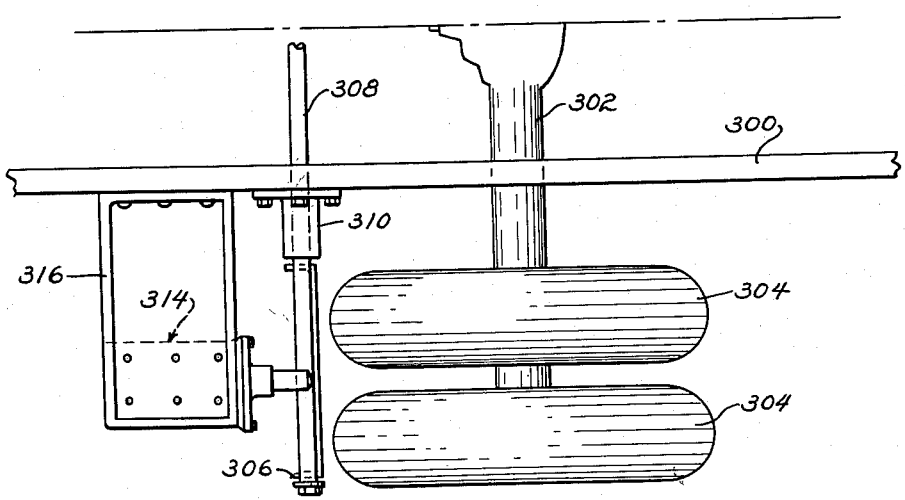
FIGURE 5 is a top plan view of part of a vehicle showing another form of emergency braking mechanism.
Figure 7:
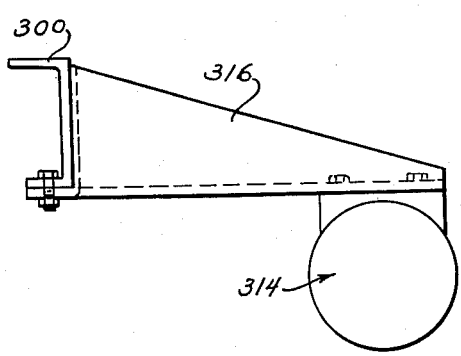
FIGURE 7 is a partial end view of the brake actuator mounting of FIGURES 5 and 6.

FIGURES 5, 6 and 7 illustrate a further embodiment of the present invention which is applicable independently of the brake mechanism of the normal service brakes. Referring to FIGURES 5 and 6, there is therein illustrated a vehicle body frame 300 conventionally suspended by a suspension mechanism (not shown) upon an axle 302 which is supported on its outer ends by ground engaging pneumatic rubber tires 304. This embodiment of the present invention provides at each side of the vehicle frame a brake shoe 306 pivoted for movement on a shaft 308 between an inoperative position as shown, to an operative position in frictional engagement with the periphery of the rubber pneumatic tires 304. Shaft 308 extends transversely of the vehicle frame and is mounted on frame 300 by support brackets 310. As is apparent from FIGURES 5 and 6, the brake shoe 306 is disposed in front of the tires 304 of the vehicle and is normally resiliently biased by a relatively weak spring 312 from engagement with the tires 304 but which may be pivoted about the axis of the shaft 308 to the dotted line position of FIGURE 6 in frictional engagement with the peripheries of the tires 304.

Engagement of the brake shoe 306 with the periphery of the tires 304 is controlled by a pneumatically controlled motor 314 which is mounted on the side of the frame 300 by a bracket 316 as is clearly illustrated in FIGURES 5 to 7. Referring to FIGURE 6, the motor 314 consists of a cylinder member 318, a piston assembly 320 mounted for axial sliding movement within the bore of the cylinder member 318, and a heavy compression spring 322 mounted within cylinder member 318 in compressed relation between the end wall 324 thereof and the opposed face of the piston assembly 320. The opposite end of cylinder member 318 is closed by an end plate 326 to define, with cylinder 318 and piston assembly 320, an expansible fluid chamber 327 into which fluid is introduced and exhausted through port 328. A piston rod 330 fixed coaxially to piston assembly 328 extends in fluid tight relation through an aperture and an aligned boss 332 in the end plate 326 and abuts the adjacent face of the brake shoe 306.

The port 328 is connected in fluid communication with the air tank, such as 122 (FIGURE 2), of a conventional air brake system so that so long as normal operating air pressure is maintained within the air tank, fluid pressure is applied to chamber 327 to force piston 320 to the left as viewed in FIGURE 6 in opposition to the biasing force of the compression spring 322. Upon loss of pressure in the air tank and chamber 327, the compression spring 322 will expand, forcing piston 320 to the right as viewed in FIGURE 6 and pivoting the brake shoe 306 in an anti-clockwise direction about the pivot shaft 308 into engagement with the periphery of the tires 304 thereby establishing a frictional braking force directly on the tires to bring the vehicle to a stop.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a vehicle brake actuator assembly, a housing having two end walls and the interior of which is separated longitudinally by an internal transverse wall into a service brake actuator chamber and an emergency chamber, a flexible diaphragm peripherally secured within the service brake chamber, a brake actuating rod extending from said diaphragm slidably through the adjacent end wall of said housing, a motion transmitting rod slidably mounted in and chiefly supported by a pressure tight bearing in said transverse wall and having an enlarged end portion bearing directly against the diaphragm on the side opposite said brake actuating rod, a compression spring reacting against said one housing end wall to urge the diaphragm into direct contact with said enlarged end portion of the motion transmitting rod, means for selectively introducing actuating fluid under pressure into said service brake actuator chamber between the diaphragm and said transverse wall to selectively extend said brake actuating rod in brake applying direction, another flexible diaphragm peripherally secured in the housing and extending transversely across said emergency chamber directly engaging an enlarged formation on the other end of said motion transmitting rod, said motion transmitting rod being free of attachment to either diaphragm, means for introducing said actuating fluid under pressure into the emergency chamber between said transverse wall and one side of said other diaphragm, a powerful coiled compression spring between the other side of said other diaphragm and the other end wall of said housing, said coiled compression spring being maintained compressed during normal vehicle brake operation by the fluid pressure in the emergency chamber at the one side of said other diaphragm, and said coiled compression spring expanding when the actuating fluid pressure drops below a predetermined value to displace said other diaphragm, motion transmitting rod, first-named diaphragm and brake actuating rod as a unit in the brake applying direction, and said other diaphragm being peripherally secured between a detachable housing end portion and the remainder of said housing, said detachable housing end portion peripherally confining said coiled compression spring and including said other housing end wall.

References Cited in the file of this patent
UNITED STATES PATENTS

| | | |
|---|---|---|
| 2,318,798 | Piron | May 11, 1943 |
| 2,726,738 | Fawick | Dec. 13, 1955 |
| 2,754,805 | Beman | July 17, 1956 |
| 2,809,723 | Howze | Oct. 15, 1957 |
| 2,871,827 | Euga | Feb. 3, 1959 |